US012785204B2

(12) United States Patent
Haussmann

(10) Patent No.: US 12,785,204 B2

(45) Date of Patent: Nov. 3, 2026

(54) BATTERY HOUSING FOR A MOTOR VEHICLE

(71) Applicant: Webasto SE, Stockdorf (DE)

(72) Inventor: Jochen Haussmann, Stockdorf (DE)

(73) Assignee: Webasto SE, Stockdorf (DE)

( * ) Notice: Subject to any disclaimer, the term of this patent is extended or adjusted under 35 U.S.C. 154(b) by 178 days.

(21) Appl. No.: 17/413,549

(22) PCT Filed: Dec. 16, 2019

(86) PCT No.: PCT/EP2019/085311

§ 371 (c)(1),
(2) Date: Jun. 12, 2021

(87) PCT Pub. No.: WO2020/120796

PCT Pub. Date: Jun. 18, 2020

(65) Prior Publication Data

US 2022/0052413 A1 Feb. 17, 2022

(30) Foreign Application Priority Data

Dec. 14, 2018 (DE) ......................... 102018132292.5

(51) Int. Cl.

| | |
|---|---|
| ***H01M 50/342*** | (2021.01) |
| ***B60L 3/00*** | (2019.01) |
| ***B60L 50/64*** | (2019.01) |
| ***H01M 50/204*** | (2021.01) |
| ***H01M 50/213*** | (2021.01) |

(Continued)

(52) U.S. Cl.

CPC ....... *H01M 50/3425* (2021.01); *B60L 3/0007* (2013.01); *B60L 50/64* (2019.02); *H01M 50/204* (2021.01); *H01M 50/213* (2021.01); *H01M 50/24* (2021.01);

(Continued)

(58) Field of Classification Search

CPC .......................... H01M 50/30; H01M 50/3425
See application file for complete search history.

(56) References Cited

U.S. PATENT DOCUMENTS 8,642,204 B2 * 2/2014 Higashino ......... H01M 10/6566 429/149
2012/0196202 A1 * 8/2012 Mcinerney (Continued)

FOREIGN PATENT DOCUMENTS

CN 102165625 A * 8/2011 .............. H01M 2/08
CN 207454851 U * 6/2018 ............. F16K 17/16

(Continued)

OTHER PUBLICATIONS

International Search Report and Written Opinion for PCT/EP2019/085311 mailed Mar. 23, 2020.

*Primary Examiner* — Nicole M. Buie-Hatcher
*Assistant Examiner* — Krishna R Hammond
(74) *Attorney, Agent, or Firm* — Command IP LLP; Michael Zarrabian

(57) ABSTRACT

The present invention relates to a battery housing for receiving a battery module in its housing interior so as to form a traction battery for a motor vehicle, comprising a housing section for in part delimiting a housing interior, wherein the housing section comprises an exhaust gas duct that is integrated into said housing section so as to divert into the environment media that in the case of a defect of a battery module escape from said battery module.

19 Claims, 2 Drawing Sheets

(51) Int. Cl.
*H01M 50/24* (2021.01)
*H01M 50/358* (2021.01)
*H01M 50/367* (2021.01)

(52) U.S. Cl.
CPC ....... *H01M 50/358* (2021.01); *H01M 50/367* (2021.01); *H01M 2220/20* (2013.01)

(56) References Cited

U.S. PATENT DOCUMENTS

| | | | | |
|---|---|---|---|---|
| 2013/0065100 | A1* | 3/2013 | Kim | H01M 50/209 429/82 |
| 2013/0095356 | A1* | 4/2013 | Shimizu | H01M 50/519 429/88 |
| 2015/0140369 | A1 | 5/2015 | Itoi et al. | |
| 2016/0308182 | A1* | 10/2016 | Kim | |
| 2017/0373287 | A1* | 12/2017 | Yamashita | H01M 50/367 |
| 2019/0088981 | A1* | 3/2019 | Chen | |
| 2023/0128458 | A1* | 4/2023 | Falls | H01M 50/519 429/9 |

FOREIGN PATENT DOCUMENTS

| | | | | |
|---|---|---|---|---|
| DE | 102013015749 | A1 | 3/2015 | |
| DE | 102014207403 | A1 | 10/2015 | |
| DE | 102014213916 | A1 * | 1/2016 | H01M 50/308 |
| DE | 102015014558 | A1 | 5/2017 | |
| DE | 102018125446 | A1 | 4/2020 | |

* cited by examiner

BATTERY HOUSING FOR A MOTOR VEHICLE

CROSS-REFERENCE TO RELATED APPLICATIONS

This application is a 35 U.S.C § 371 National Stage Entry of International Application No. PCT/EP2019/085311 filed Dec. 16, 2019, which claims the priority benefit of German Patent Application Serial Number DE 102018132292 filed Dec. 14, 2018, all of which are incorporated herein by reference in their entirety for all purposes.

TECHNICAL FIELD

The present invention relates to a battery housing for a motor vehicle, said battery housing being embodied so as to form a traction battery for the motor vehicle, wherein the battery housing forms a housing interior which can receive at least one battery module.

BACKGROUND

Battery systems for electric and hybrid vehicles and also vehicles having fuel cells are the subject of current research and development. The performance-related parameters of a battery system, such as the serviceable life and capacity, depend greatly on the environment of the application. The electrochemical processes that occur in the battery are for example dependent upon the ambient temperature both in the case of providing and outputting electrical power and also during the charging procedure.

It is therefore important for a reliable operation of a battery system to be able to create and maintain a well-defined environment. In addition, the individual battery modules must be protected and wired together. For these and other reasons, a battery housing is provided that is configured so as to receive battery modules and so as to protect said battery modules against external influences.

Simultaneously, the battery housing serves as a safety device in the event of a defect, such as a thermal runaway, which can lead to media, such as for example hot gases, combustion products and battery cell components being discharged in an explosion-like manner from a battery cell. In order to keep damage to the battery system as small as possible, endeavors are made to remove these media from the battery housing in a controlled manner.

Current battery modules degas to a great extent in a diffuse and uncontrolled manner into the battery housing. The reduction of pressure out of the housing into the environment is realized by means of an emergency venting system, also referred to as a "venting system". For reasons related to cost, only a few emergency venting systems are provided.

The publication DE 10 2014 207 403 A1 describes a battery unit having a plurality of electrochemical cells and a degassing collector. The degassing collector comprises a degassing duct and a cooling duct. Moreover, the degassing collector comprises openings by way of which fluid that escapes out of the electrochemical cells and passes a safety valve can pass into the degassing duct and can be discharged. A similar venting system is described in US 2012/0129024 A1.

The medium that escapes in the event of a thermal runaway has such a high energy content, comparable with a welding torch, with the result that substantial damage can occur to the battery housing even in the case of an installed venting system. In this case, it is possible to provide in particular control-relevant devices in the battery housing. The distances which the media must cover in the housing can lead to uncontrolled pressure losses and/or blockages. It is therefore difficult to ensure a homogenous, controlled venting behavior in the event of an emergency, in particular if battery modules that are located a comparatively long distance from the venting system are affected by a defect.

DISCLOSURE OF THE INVENTION

One object of the invention is to improve the safety of a battery system.

The object is achieved by means of a battery housing having the features of claim 1. Advantageous embodiments are disclosed in the subordinate claims, the following illustration of the invention and the description of preferred exemplary embodiments and the attached figures.

Accordingly, a battery housing for receiving a battery module in its housing interior so as to form a traction battery for a motor vehicle is proposed that comprises a housing section so as in part to delimit a housing interior. In accordance with the invention, the housing section comprises an exhaust gas duct that is integrated in said housing section so as to divert into the environment media that in the case of a defect of a battery module are discharged from said battery module.

The term "media" is to be understood in this case to mean mainly hot gases, combustion products and battery cell components that can arise and/or be released possibly in the case of a thermal runaway of a battery cell of the battery module. For example, in the event of a thermal runaway, hot gases escape from the affected battery cell in a quasi-explosion-like manner. The hot gas flow can consequently also include fluids and solids such as particles or fragments that are caused by the explosion. The terms "media" and "exhaust gas" are used synonymously.

By virtue of integrating the exhaust gas duct in the housing section, it is possible to control the discharge of exhaust gas in the case of a defect irrespective of the affected battery module and its position in the housing interior. The transportation path in the housing interior is minimized since a large portion of the exhaust gas path occurs in the exhaust gas duct that is integrated in the housing interior, in other words within the housing wall.

Consequently, the functional safety of the battery housing is increased since possible pressure losses and/or blockages are minimized and the exhaust gas being discharged avoids and consequently treats with care both the devices that are necessary for the functioning of the battery system and also the safety components in the housing interior. In addition, the media that has a high energy density and is escaping from the battery module can be drained away from other battery modules in a purposeful manner, as a result of which adjacent battery modules are prevented from possibly catching fire or at least delayed.

Moreover, the exhaust gas duct can be integrated in the housing section in a simple, installation space-saving and cost-effective manner. By virtue of integrating the exhaust gas duct in the housing section, it is possible in addition to provide additional safety since the exhaust gas duct is particularly protected with the result that it can hardly be damaged for example as a result of a battery cell of a battery module bursting apart. It is to be noted that the above technical effects and advantages are realized to the same extent in the case of a plurality of integrated exhaust gas ducts.

The battery housing can be manufactured from synthetic material, metal, any other material or a combination of different materials and serves to provide protection against external influences for the battery modules that are received in the housing interior. The battery housing is preferably configured for use in an electric or hybrid vehicle or vehicle having a fuel cell.

It is preferred that during normal operation the housing interior is sealed with respect to the environment in such a manner that substantially gas and/or fluid is not exchanged with the environment, wherein a forced venting system is provided by means of which it is possible to equalize the pressure between the housing interior and the environment.

The housing serves to protect the battery modules that are received therein and devices, possible control devices and cabling, against external influences and to create and maintain an atmosphere that is favorable for the operation of the battery modules. For this reason, in the normal state the housing seals the interior preferably completely, for example hermetically. It is only possible to equalize the pressure by means of the forced venting system. The forced venting system is preferably configured in this case in such a manner that only a gas exchange at a low volume flow is possible with the result that penetration of dirt or water into the housing interior does not give any cause for concern.

It is preferred that the exhaust gas duct comprises an inner opening by way of which the exhaust gas duct communicates with the housing interior. It is thus possible to realize that in the event of a thermal runaway of a battery cell the media that in this case escapes from the battery cell can be diverted by way of the exhaust gas duct out of the housing interior of the battery housing into the environment. It is possible in this manner to realize the sealing and safety function of the battery housing in a reliable manner and in a manner that is structurally simple and compact.

In this case, it is preferred that a battery module is received in the housing interior, said battery module comprising a module-internal exhaust gas duct that communicates with the inner opening, wherein the module-internal exhaust gas duct is preferably connected directly to the inner opening. By virtue of directly connecting the module-internal exhaust gas duct to the inner opening, it is possible to further reduce the exhaust gas path in the housing interior. Consequently, the media flow as quickly as possible into the exhaust gas duct that is integrated in the housing section. Consequently, the functional safety of the battery housing is further increased since possible pressure losses and/or blockages are minimized and the exhaust gas being discharged optimally avoids and consequently treats with care both the devices that are necessary for the functioning of the battery module and also the safety components in the housing interior.

In a preferred embodiment, a plurality of battery modules having in each case at least one module-internal exhaust gas duct are received in the housing interior and the integrated exhaust gas duct comprises a plurality of inner openings, wherein each module-internal exhaust gas duct communicates respectively with an inner opening, wherein it is preferred that each module-internal exhaust gas duct is connected directly to the corresponding inner opening. Consequently a direct access to the exhaust gas duct is provided for each battery module, as a result of which in the event of a defect the exhaust gases can be discharged extremely rapidly and directly into the external environment without having to make unnecessary detours by way of the housing interior. In order to connect a plurality of battery modules to an exhaust gas duct, it is preferred that the exhaust gas duct comprises at least one section that extends in the plane of the housing section, in other words parallel to the outer and inner surface of the housing section.

It is preferred that the exhaust gas duct communicates with the housing interior by way of a safety valve, wherein the safety valve is configured so as to close the exhaust gas duct during normal operation and to open the exhaust gas duct in the event that media occur in the case of a defect of a battery module. The safety valve is preferably provided in the exhaust gas duct, however, it can also be provided in a module-internal exhaust gas duct or as a separate component. It is possible in this manner to realize in a reliable manner the above described sealing and safety functions of the battery housing. In particular, by virtue of providing the safety valve it is possible for the battery housing to continue to be hermetically sealed during normal operation.

It is to be noted that the features, technical effects and advantages that are described herein apply to the same extent for the case of a plurality of exhaust gas ducts, battery modules, safety valves etc. even if for the sake of linguistic simplicity singular terms are mainly used.

It is preferred that the safety valve opens the exhaust gas duct if the amount of a pressure difference between the housing interior and the external environment exceeds a threshold valve. In this case, the pressure difference is used to determine in a simple and reliable manner that the safety valve is to be triggered.

Consequently, it is possible to realize a design of the safety valve which is particularly compact, operationally safe and safe during the assembly procedure by virtue of the fact that the safety valve is provided at the inner opening and is preferably integrated in the housing section.

In this case, the safety valve can comprise a bursting disk or can be embodied as such a bursting disk that shatters on opening. The safety behavior that is illustrated above and determined by the pressure difference can be realized in this manner in a structurally particularly simple and simultaneously reliable manner.

It is particularly preferred that the bursting disk is embodied by a localized thinning of the wall of the housing section in the region of the exhaust gas duct. Such a reduction of the wall thickness can be produced in a simple manner for example by milling out material. The residual wall thickness of the bursting disk is selected in this case to be such that in the event of a thermal runaway of a battery cell the hot media that subsequently occur or rather the pressure that is generated by said media cause the bursting disk to shatter and thus open the path to the exhaust gas duct. By virtue of the fact that the bursting disk is realized by means of a reduction in the wall thickness, it is possible to adapt the position and design of the safety valve in addition in a flexible manner to suit different geometric shapes or configurations of the battery housing and the safety valve is simultaneously operationally safe and safe during the assembly procedure.

It is preferred that the housing section comprises an extrusion profile or is produced by means of an extrusion method. This means that the housing section can be produced or is produced by means of an extrusion method. This renders it possible to integrate the exhaust gas duct in the housing section in a manner that is simple with regard to construction and manufacturing technology.

It is preferred that the housing section forms a base of the battery housing or a part of the battery housing. The housing wall forms therein the outer shape or casing that delimits and defines the housing interior. In other words, the housing section is preferably not a device that is located in the housing interior as a result of which the functional safety of the battery housing is optimized in the event of a defect.

It is preferred that the housing section is the base of the housing or a part of the base since the base is usually used so as to connect the battery module. The above described technical effects which relate to shortening the exhaust gas path in the housing interior are optimized in accordance with this particularly preferred embodiment.

It is preferred that the housing section is embodied as one piece and the exhaust gas duct is embedded therein, as a result of which the exhaust gas duct is particularly protected and the functional safety of the battery housing is optimized in the event of a defect.

It is preferred that the battery module comprises a plurality of cylindrical battery cells that are held together mechanically. For this purpose, the battery module preferably comprises one or a plurality of cell holders which receive the battery cells at least in part, as a result of which the battery cells are held in predetermined positions and in predetermined orientations.

In the event of a defect of a battery cell which leads to a thermal runaway, the media are conveyed by way of the module-internal exhaust gas duct to the integrated exhaust gas duct and discharged safely and in a controlled manner outward.

Further advantages and features of the present invention are apparent in the following description of preferred exemplary embodiments. The features described therein can be implemented as stand alone or in combination with one or more of the above illustrated features insofar as the features do not counteract one another. Preferred exemplary embodiments are described below with reference to the accompanying drawings.

BRIEF DESCRIPTION OF THE FIGURES

Preferred further embodiments of the invention are explained in detail by the following description of the figures. In the drawings.

DETAILED DESCRIPTION OF PREFERRED EXEMPLARY EMBODIMENTS

Preferred exemplary embodiments are described below with reference to the figures. In so doing, like, similar or like-functioning elements are provided in the different figures with identical reference signs and in part a repeated description of these elements is not provided in order to avoid redundancies.

Figure 1:
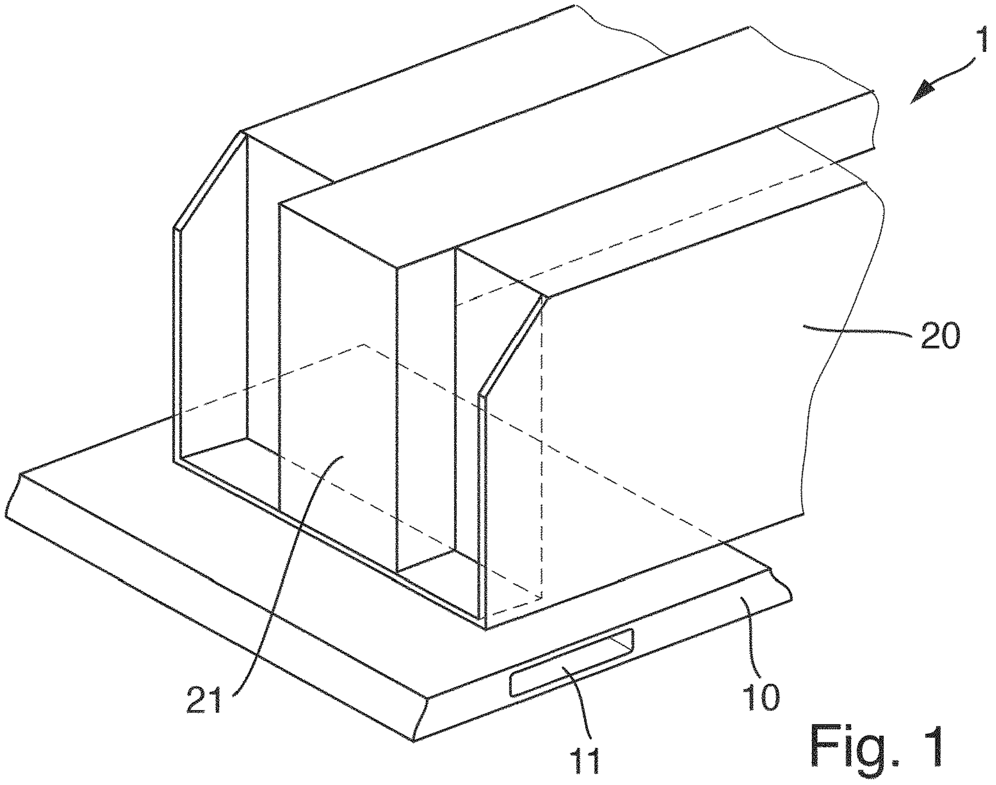
FIG. 1 illustrates in a perspective and in part transparent manner a section of a battery housing that comprises a housing base having an integrated exhaust gas duct and a battery module that is attached therero.

FIG. 1 illustrates a section of a battery housing 1.

The battery housing 1 comprises a housing section 10 that is a housing base in the present exemplary embodiment. The housing section 10 forms at least one part of a housing wall of the battery housing 1. In other words, the housing wall forms the outer shape or casing of the battery housing 1, i.e. the housing section 10 is not a device that is located in the interior of the battery housing 1.

The housing wall delimits and defines the housing interior which then eventually receives battery modules and other devices, thus creating a battery system so as to form a traction battery for a motor vehicle.

An exhaust gas duct 11 is integrated in the housing section 10.

The housing section 10 is preferably produced by means of an extrusion method, as a result of which the exhaust gas duct 11 can be integrated in the housing section 10 in a manner that is simple with regard to construction and manufacturing technology. The housing section 10 consequently comprises preferably an extrusion profile from which the housing section 10 can be embodied in the form of the housing base. The housing section 10 is for example manufactured from a metal, for example aluminum.

The housing section 10, for example the housing base of the battery housing 1, can be constructed from a plurality of extrusion profiles that are arranged adjacent to one another and then connected to one another. It is then possible to provide the exhaust gas duct 11 that is described herein in one or more of these extrusion profiles in order to realize a controlled discharge of media in the case of a thermal runaway of a battery cell.

If a plurality of extrusion profiles are arranged adjacent to one another so as to form the housing section 10—for example to form the housing base of the battery housing 1—it is thus possible to also provide a plurality of exhaust gas ducts 11 adjacent to one another and substantially parallel to one another.

The battery housing 1, in particular the housing section 10, can however also be manufactured using a different method, for example by means of injection molding, and/or from a different material.

Figure 3:
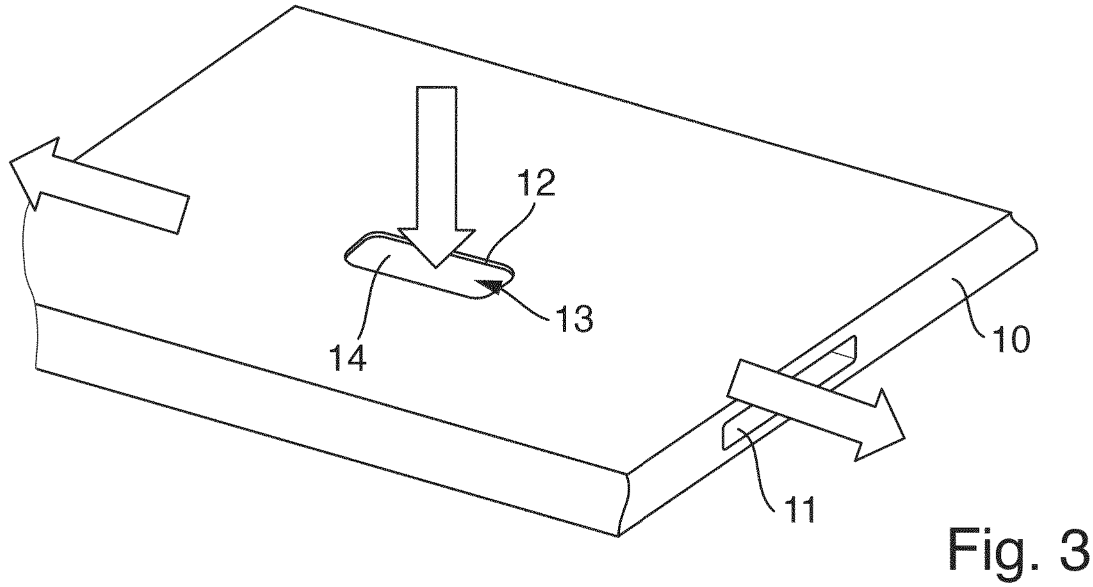
FIG. 3 illustrates in a perspective manner a section of the housing base with an integrated exhaust gas duct in accordance with FIG. 1 but without the battery module, as a result of which the safety valve to the exhaust gas duct is visible.
Figure 4:
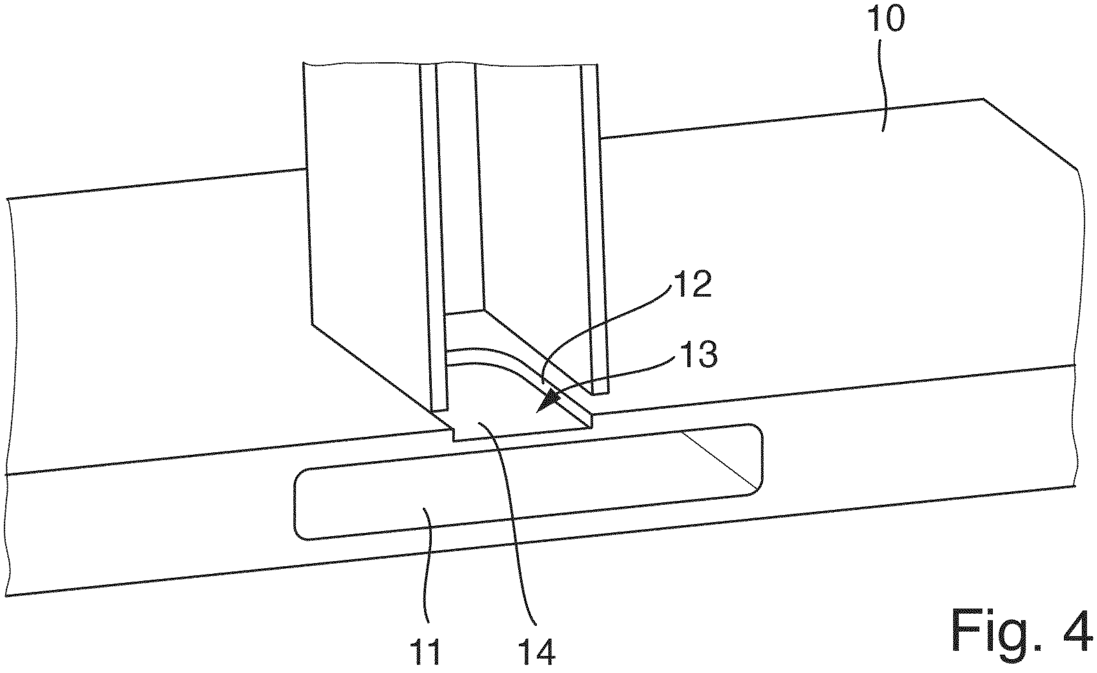
FIG. 4 illustrates in a perspective and sectioned view the positioning and connection of the module-internal exhaust gas duct to the integrated exhaust gas duct.

The exhaust gas duct 11 comprises at least one inner opening 12, the length, shape and design of which are apparent in FIGS. 3 and 4. The inner opening 12 connects the exhaust gas duct 11 to the housing interior—to be more precise to a battery module 20 that is provided in the housing interior, as is described below in detail. Moreover, the exhaust gas duct 11 comprises one or a plurality of outer openings (not illustrated in the figures) by way of which the media that escape in the event of a defect are discharged outward. In this manner, in an emergency the housing interior communicates by way of the exhaust gas duct 11 with the external environment with the result that the media can to a great extent be discharged into the environment and does not remain in the interior of the battery housing 1.

It is preferred that the exhaust gas duct 11 comprises at least one section that extends in the plane of the housing section 10, in other words parallel to the outer surface and inner surface of the housing section 10. It is possible in this manner to connect a plurality of battery modules 20 to the exhaust gas duct 11. In addition, the housing section 10 together with the integrated or embedded exhaust gas duct 11 can be manufactured in this manner in a particularly simple manner as an extrusion profile.

During the production of the housing section 10 by means of an extrusion profile, the exhaust gas duct 11 lies in a typical manner in the extrusion direction and therefore extends along the entire extrusion profile parallel to the surfaces that form the outer and the inner surface of the battery housing 1 or of the housing section 10.

The battery housing 1 and consequently the housing interior is substantially sealed with respect to the environment for the normal operation with the result that the components that are received in the battery housing 1, in particular the battery modules 20, are protected against the environment and its influences.

It is preferred that the battery housing 1 comprises a forced venting system by means of which it is possible to equalize the pressure between the interior of the battery housing 1 and the environment in order to avoid the build-up of an overpressure or a vacuum in the battery housing 1. In this case, the forced venting system is dimensioned very small and in the case of a thermal runaway of a battery cell cannot be used to discharge media into the environment.

In order to ensure during normal operation that the housing provides protection for the battery modules 20 and possibly other devices against external influences, a safety valve 13 is provided in the exhaust gas duct 11, preferably in the region of the inner opening 12.

The safety valve 13 opens or releases if the pressure difference between the housing interior and the exhaust gas duct 11 that is connected to the external environment is excessively high. Thus, the safety valve 13 opens if the pressure difference exceeds a threshold value, for example of approx. 1 bar.

The safety valve 13 is preferably realized by means of a so-called bursting disk 14 that shatters when triggered. In accordance with a particularly preferred, structurally simple and yet reliable exemplary embodiment, the bursting disk 14 is produced by milling out material or by otherwise thinning the wall of the housing section 10 in the region of the exhaust gas duct 11.

The exhaust gas duct 11 is dimensioned such that it renders possible a volume flow that enables media to be discharged in the case of damage without the pressure in the interior of the battery housing 1 increasing excessively.

This is particularly apparent in the sectional view of FIG. 4. The residual wall thickness of the bursting disk 14 is selected in this case such that in the event of thermal propagation the hot gas that impinges against said bursting disk shatters the bursting disk 14 and thus opens the path to the exhaust gas duct 11.

Figure 2:
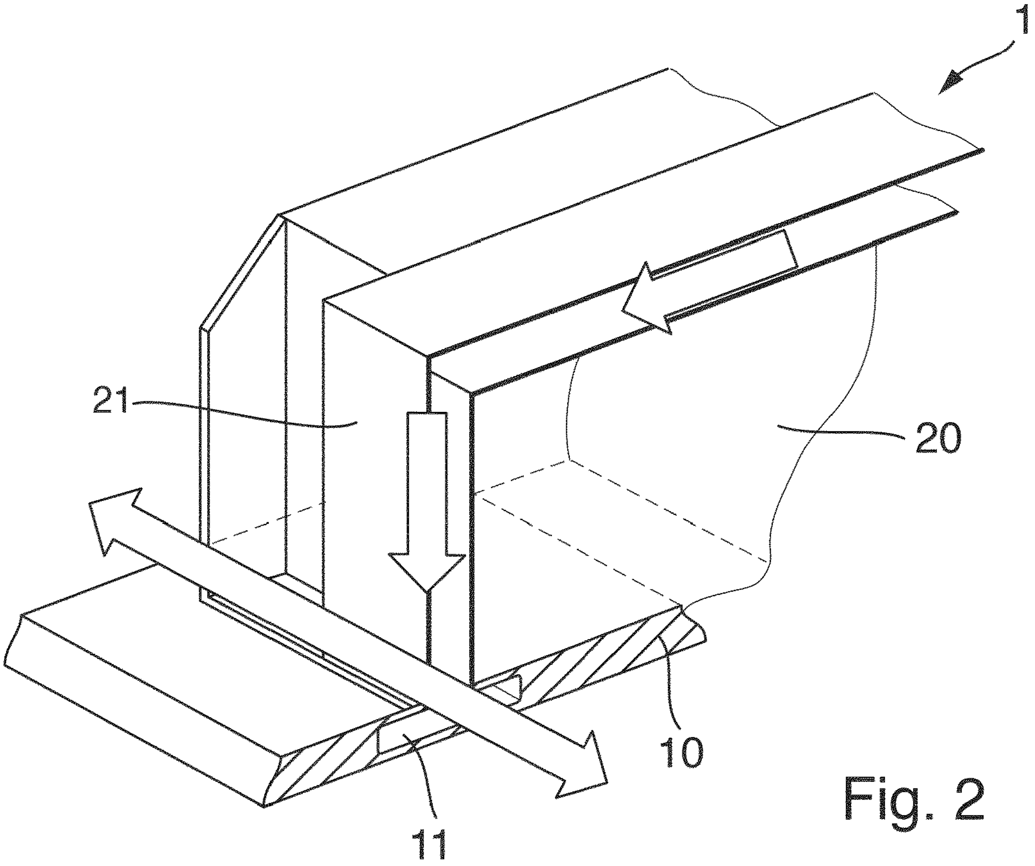
FIG. 2 illustrates the flow path which exhaust gases follow in the event of a defect of the battery module in accordance with FIG. 1.

Moreover, the battery housing 1 comprises at least one, preferably a plurality of battery modules 20 that are located in the interior of the battery housing 1. FIGS. 1 and 2 illustrate by way of example a battery module 20, in part in a transparent manner, in order to illustrate schematically by means of the arrows the flow path of the media and the connection to the exhaust gas duct 11.

Typically, a plurality of cylindrical battery cells is combined to form a battery module 20. For this purpose, the battery module 20 comprises one or a plurality of cell holders which receive the battery cells at least in part, as a result of which the battery cells are held together mechanically in predetermined positions and in predetermined orientations. The battery cells, the battery holders and contact arrangements thereof are not illustrated in the figures for the sake of clarity.

The battery module 20 comprises a module-internal exhaust gas duct 21 that in the event of a defect of a battery cell conveys the media that escapes from the battery cell to the exhaust gas duct 11. For this purpose, the module-internal exhaust gas duct 21 communicates with the inner opening 12. The connection of the module-internal exhaust gas duct 21 to the exhaust gas duct 11 is particularly apparent in FIG. 4.

It is preferred that the battery cells comprise predetermined breaking points, as a result of which the exit site of the media is largely defined. The position and shape of the module-internal exhaust gas duct 21 can be determined accordingly, as a result of which any uncontrolled, diffused degassing is reduced or prevented.

It is to be noted that although the safety valve 13 is for manufacturing reasons preferably a component of the housing section 10, it is however alternatively also possible to provide it in the module-internal exhaust gas duct 21.

It is preferred that each battery module 20 is connected individually to an exhaust gas duct 11 by way of a dedicated module-internal exhaust gas duct 21 and an associated safety valve 13 even if for the sake of clarity only one battery module 20 and one exhaust gas duct 11 is illustrated in the figures.

By virtue of implementing the above illustrated exhaust gas discharge procedure in the housing section 10, preferably in the housing base, it is possible by means of the exhaust gas duct 11 to ensure that the exhaust gas is discharged in a controlled manner in the event of a defect irrespective of the affected battery module 20 and its position in the housing.

The transportation path for the media in the interior of the battery housing 1 is minimized. Consequently, the functional safety of the battery housing 1 is increased since the procedure of discharging the exhaust gases treats with care both the devices that are necessary for the functioning of the battery module and also the safety components in the housing interior and realizes short degassing paths. Possible pressure losses and/or blockages are consequently minimized, as a result of which the exhaust gas is discharged in a controlled manner into the external environment.

In addition, the exhaust gas duct 11 or the plurality of exhaust gas ducts 11 is/are to be integrated in the housing in a simple, installation-space saving and cost-effective manner. Furthermore, by virtue of embedding the exhaust gas ducts 11 in the housing wall it is possible to provide additional safety since the exhaust gas ducts 11 are protected and they are hardly damaged in the event that a battery cell bursts in the interior of a battery module 20.

It is preferred that at least one direct access to an exhaust gas duct 11 is provided for each battery module 20, as a result of which in the event of a defect the exhaust gases can be discharged extremely rapidly into the external environment without having to make detours by way of the housing interior.

The safety valve 13 or the plurality of safety valves 13 is/are realized possibly as a bursting disk 14, preferably by milling-out or tapering the wall in the region of the exhaust gas duct 11. As a consequence, the safety valves 13 can be adapted in a simple and flexible manner to suit different geometric shapes or configurations of the battery housing 1.

Where applicable, all individual features that are illustrated in the exemplary embodiments can be combined with one another and/or exchanged without abandoning the scope of the invention.

LIST OF REFERENCE SIGNS

- 1 Battery housing
- 10 Housing section
- 11 Exhaust gas duct
- 12 Inner opening
- 13 Safety valve
- 14 Bursting disk
- 20 Battery module
- 21 Module-internal exhaust gas duct

The invention claimed is:

1. A battery housing receiving a plurality of battery modules in a housing interior for forming a traction battery for a motor vehicle, wherein each battery module comprises a plurality of battery cells that are held together mechanically, the battery housing comprising:

a housing section for in part delimiting the housing interior, the housing section being at least a part of a housing wall forming the outer shape of the battery housing, the housing wall extending in a thickness direction between an inner wall surface facing the housing interior and an outer wall surface opposite the inner wall surface;

wherein the housing section comprises an integrated exhaust gas duct so as to divert into the environment media that, in the case of a defect of a battery module, escapes from said battery module;

wherein the integrated exhaust gas duct is integrated within the housing wall forming the outer shape of the battery housing;

wherein the integrated exhaust gas duct extends transverse to the thickness direction and parallel to the inner wall surface and the outer wall surface inside the housing wall sandwiched between the inner wall surface and the outer wall surface;

wherein the integrated exhaust gas duct comprises at least one inner opening at the inner wall surface that connects the exhaust gas duct to the housing interior, and at least one outer opening at the outer wall surface by way of which the media that escapes in the event of a defect are discharged outward with respect to the battery housing;

wherein the plurality of battery modules have in each case at least one module-internal exhaust gas duct received in the housing interior and the integrated exhaust gas duct comprises a plurality of inner openings at the inner wall surface, wherein each module-internal exhaust gas duct communicates respectively with a one inner opening, wherein each module-internal exhaust gas duct is connected directly to the corresponding inner opening; and wherein during a normal operation the housing interior is sealed with respect to the environment in such a manner that at least one of: gas and fluid is not exchanged with the environment, wherein a forced venting system is provided, and wherein the forced venting system is configured to equalize the pressure between the housing interior and the environment during the normal operation.

2. The battery housing as claimed in claim 1, wherein the battery module is received in the housing interior and said battery module comprises a module-internal exhaust gas duct that communicates with the inner opening.

3. The battery housing as claimed in claim 2, wherein a plurality of battery modules having in each case at least one module-internal exhaust gas duct are received in the housing interior and the integrated exhaust gas duct comprises a plurality of inner openings, wherein each module-internal exhaust gas duct communicates respectively with an inner opening.

4. The battery housing as claimed in claim 1, wherein the exhaust gas duct communicates with the housing interior by way of a safety valve, wherein the safety valve is configured so as to close the exhaust gas duct during the normal operation and to open the exhaust gas duct in the event that media occur in the case of a defect of a battery module.

5. The battery housing as claimed in claim 4, wherein the safety valve is provided at the inner opening.

6. The battery housing as claimed in claim 5, wherein the safety valve is configured so as to open the exhaust gas duct if an amount of a pressure difference between the housing interior and an external environment exceeds a threshold value.

7. The battery housing as claimed in claim 6, wherein the safety valve comprises a bursting disk.

8. The battery housing as claimed in claim 7, wherein the bursting disk is embodied by a localized thinning of the wall of the housing section in the region of the exhaust gas duct.

9. The battery housing as claimed in claim 1, wherein the housing section is formed by one or more extrusion profiles, wherein the integrated exhaust duct is integrated in one or more of the one or more extrusion profiles.

10. The battery housing as claimed in claim 1, wherein the housing section forms at least in part a base of the battery housing.

11. The battery housing as claimed in claim 1, wherein the housing section is embodied in one piece and the exhaust gas duct is embedded therein.

12. A battery system so as to form a traction battery for a motor vehicle, the battery system comprising:

a battery housing receiving a plurality of battery modules in a housing interior for forming the traction battery, wherein each battery module comprises a plurality of battery cells that are held together mechanically, the battery housing comprising a housing section for in part delimiting a housing interior, the housing section being at least a part of a housing wall forming the outer shape of the battery housing, the housing wall extending in a thickness direction between an inner wall surface facing the housing interior and an outer wall surface opposite the inner wall surface;

wherein the housing section comprises an integrated exhaust gas duct that is integrated into the housing section so as to divert into the environment media that, in the case of a defect of a battery module, escapes from the battery module, wherein the integrated exhaust gas duct is integrated within the housing wall forming the outer shape of the battery housing, wherein the integrated exhaust gas duct extends transverse to the thickness direction and parallel to the inner wall surface and the outer wall surface inside the housing wall sandwiched between the inner wall surface and the outer wall surface, wherein the integrated exhaust gas duct comprises at least one inner opening at the inner wall surface that connects the exhaust gas duct to the housing interior, and at least one outer opening at the outer wall surface by way of which the media that escapes in the event of a defect are discharged outward with respect to the battery housing, wherein the plurality of battery modules have in each case at least one module-internal exhaust gas duct received in the housing interior and the integrated exhaust gas duct comprises a plurality of inner openings at the inner wall surface, wherein each module-internal exhaust gas duct communicates respectively with one inner opening, wherein each module-internal exhaust gas duct is connected directly to the corresponding inner opening.

13. The battery housing as claimed in claim 2, wherein the module-internal exhaust gas duct is connected directly to the inner opening.

14. The battery housing as claimed in claim 3, wherein each module-internal exhaust gas duct is connected directly to the corresponding inner opening.

15. The battery housing as claimed in claim 5, wherein the safety valve is integrated in the housing section.

16. The battery housing as claimed in claim 7, wherein the bursting disk shatters on opening.

17. The battery housing as claimed in claim 7, wherein the safety valve is formed by the bursting disk.

18. The battery housing as claimed in claim 9, wherein the extrusion profile is produced by an extrusion method.

19. The battery housing as claimed in claim 7, wherein the bursting disk is embodied by a localized thinning of the wall of the housing section in the region of the exhaust gas duct.

* * * * *